US008523667B2

(12) United States Patent
Clavin et al.

(10) Patent No.: US 8,523,667 B2
(45) Date of Patent: Sep. 3, 2013

(54) PARENTAL CONTROL SETTINGS BASED ON BODY DIMENSIONS

(75) Inventors: John Clavin, Seattle, WA (US); Gaelle Vialle, Redmond, WA (US); Aaron Kornblum, Mercer Island, WA (US)

(73) Assignee: Microsoft Corporation, Redmond, WA (US)

(*) Notice: Subject to any disclaimer, the term of this patent is extended or adjusted under 35 U.S.C. 154(b) by 425 days.

(21) Appl. No.: 12/749,385

(22) Filed: Mar. 29, 2010

(65) Prior Publication Data

US 2011/0237324 A1    Sep. 29, 2011

(51) Int. Cl.
*A63F 9/24* (2006.01)
*G06F 3/033* (2013.01)

(52) U.S. Cl.
USPC .......... 463/29; 725/28; 345/18; 715/810

(58) Field of Classification Search
None
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |

(Continued)

FOREIGN PATENT DOCUMENTS

| | | |
|---|---|---|
| CN | 101254344 B | 6/2010 |
| EP | 0583061 A2 | 2/1994 |

(Continued)

OTHER PUBLICATIONS

"Telecommunications and Internet Converged Services and Protocols for Advanced Networking (TISPAN); Service Layer Requirements to Integrate NGN Services and IPTV", Draft ETSI TS 181 016 V3.2.0, Nov. 2008, F-06921 Sophia Antipolis Cedex, France.

(Continued)

*Primary Examiner* — David L Lewis
*Assistant Examiner* — Shauna-Kay Hall
(74) *Attorney, Agent, or Firm* — Vierra Magen Marcus LLP

(57) ABSTRACT

In a motion capture system having a depth camera, access to an electronic media device such as personal computer or a game console with Internet connectivity is controlled. The age group of a person in a field of view of the camera can be determined based on metrics of a 3-D body model. The metrics can relate to, e.g., a relative size of a head of the body, a ratio of arm length to body height, a ratio of body height to head height, and/or a ratio of head width to shoulder width. The metrics are particularly indicative of age group. Based on the age group, a profile of the user is automatically updated with various parental control settings which control access to the electronic media device. Also, currently output content can be replaced by substitute content when a person in a lower age group enters the field of view.

14 Claims, 10 Drawing Sheets

(56) References Cited

U.S. PATENT DOCUMENTS

| | | | |
|---|---|---|---|
| 4,925,189 A | 5/1990 | Braeunig | |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson et al. | |
| 5,534,917 A | 7/1996 | MacDougall | |
| 5,563,988 A | 10/1996 | Maes et al. | |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,638,300 A | 6/1997 | Johnson | |
| 5,641,288 A | 6/1997 | Zaenglein | |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,875,108 A | 2/1999 | Hoffberg et al. | |
| 5,877,803 A | 3/1999 | Wee et al. | |
| 5,913,727 A | 6/1999 | Ahdoot | |
| 5,933,125 A | 8/1999 | Fernie | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,031,934 A * | 2/2000 | Ahmad et al. | 382/154 |
| 6,054,991 A | 4/2000 | Crane et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,363,160 B1 | 3/2002 | Bradski et al. | |
| 6,384,819 B1 | 5/2002 | Hunter | |
| 6,411,744 B1 | 6/2002 | Edwards | |
| 6,430,997 B1 | 8/2002 | French et al. | |
| 6,476,834 B1 | 11/2002 | Doval et al. | |
| 6,496,598 B1 | 12/2002 | Harman | |
| 6,503,195 B1 | 1/2003 | Keller et al. | |
| 6,539,931 B2 | 4/2003 | Trajkovic et al. | |
| 6,570,555 B1 | 5/2003 | Prevost et al. | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,674,877 B1 | 1/2004 | Jojic et al. | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,765,726 B2 | 7/2004 | French et al. | |
| 6,788,809 B1 | 9/2004 | Grzeszczuk et al. | |
| 6,801,637 B2 | 10/2004 | Voronka et al. | |
| 6,873,710 B1 | 3/2005 | Cohen-Solal et al. | |
| 6,873,723 B1 | 3/2005 | Aucsmith et al. | |
| 6,876,496 B2 | 4/2005 | French et al. | |
| 6,937,742 B2 | 8/2005 | Roberts et al. | |
| 6,950,534 B2 | 9/2005 | Cohen et al. | |
| 7,003,134 B1 | 2/2006 | Covell et al. | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,113,918 B1 | 9/2006 | Ahmad et al. | |
| 7,121,946 B2 | 10/2006 | Paul et al. | |
| 7,131,132 B1 * | 10/2006 | Gehlot et al. | 725/10 |
| 7,134,130 B1 * | 11/2006 | Thomas | 725/25 |
| 7,170,492 B2 | 1/2007 | Bell | |
| 7,184,048 B2 | 2/2007 | Hunter | |
| 7,202,898 B1 | 4/2007 | Braun et al. | |
| 7,222,078 B2 | 5/2007 | Abelow | |
| 7,227,526 B2 | 6/2007 | Hildreth et al. | |
| 7,259,747 B2 | 8/2007 | Bell | |
| 7,308,112 B2 | 12/2007 | Fujimura et al. | |
| 7,317,836 B2 | 1/2008 | Fujimura et al. | |
| 7,348,963 B2 | 3/2008 | Bell | |
| 7,359,121 B2 | 4/2008 | French et al. | |
| 7,367,887 B2 | 5/2008 | Watabe et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,472,424 B2 * | 12/2008 | Evans et al. | 726/27 |
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |

| | | | |
|---|---|---|---|
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,840,031 | B2 * | 11/2010 | Albertson et al. ............ 382/103 |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2005/0086069 | A1 | 4/2005 | Watson et al. |
| 2006/0288234 | A1 * | 12/2006 | Azar et al. .................... 713/186 |
| 2007/0013515 | A1 * | 1/2007 | Johnson et al. ............ 340/568.1 |
| 2007/0100653 | A1 | 5/2007 | Ramer et al. |
| 2008/0026838 | A1 | 1/2008 | Dunstan et al. |
| 2008/0152191 | A1 | 6/2008 | Fujimura et al. |
| 2008/0316324 | A1 * | 12/2008 | Rofougaran et al. ...... 348/222.1 |
| 2009/0115776 | A1 | 5/2009 | Bimbra et al. |
| 2009/0133051 | A1 * | 5/2009 | Hildreth ......................... 725/28 |
| 2009/0141933 | A1 | 6/2009 | Wagg |
| 2009/0215533 | A1 * | 8/2009 | Zalewski et al. ................ 463/32 |
| 2009/0221368 | A1 | 9/2009 | Yen et al. |
| 2009/0264101 | A1 | 10/2009 | Jeong et al. |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | WO2009059065 | 5/2009 |

OTHER PUBLICATIONS

Breen, "Leopard's Parental Controls", Website, About.com, Oct. 23, 2008, http://pcworld.about.com/od/software2/Leopard-s-Parental-Controls.htm.

Collier, "New Tool for Keeping Web Searches Safe", Website, NetFamilyNews.org, Nov. 11, 2009, http://www.netfamilynews.org/labels/parental%20controls.html.

Snyder, "Physical Characteristics of Children As Related to Death and Injury for Consumer Product Design and Use", UM-HSRI-BI-75-5 Final Report Contract FDA-72-70, May 1975, http://ovrt.nist.gov/projects/anthrokids/child.html.

"Drawing the Human Form—Proportions from Child to Adult", Website, idrawdigital, Tutorials for drawing comics, illustration tips and resources, Jan. 18, 2009, http://www.idrawdigital.com/2009/01/drawing-the-human-form-proportions-from-child-to-adult/.

Zhao, Liang, "Dressed Human Modeling Detection and Parts Localization," The Robotics Institute, Carnegie Mellon University, Pittsburgh, PA, Jul. 26, 2001, 121 pages.

Shivappa, et al., "Person Tracking With Audio-visual Cues Using the Iterative Decoding Framework," IEEE 5th International Conference on Advanced Video and Signal Based Surveillance, 2008, pp. 260-267.

Toyama, et al., "Probabilistic Tracking in a Metric Space," Eighth International Conference on Computer Vision, Vancouver, Canada, vol. 2, Jul. 2001, 8 pages.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", in Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real-World Disorders", Science Psychology.

"Simulation and Training", 1994, Division Incorporated.

English Machine-translation of Japanese Publication No. JP08-044490 published on Feb. 16, 1996.

Chinese Office Action dated Jun. 9, 2013, Chinese Patent Application No. 201110084908.1.

* cited by examiner

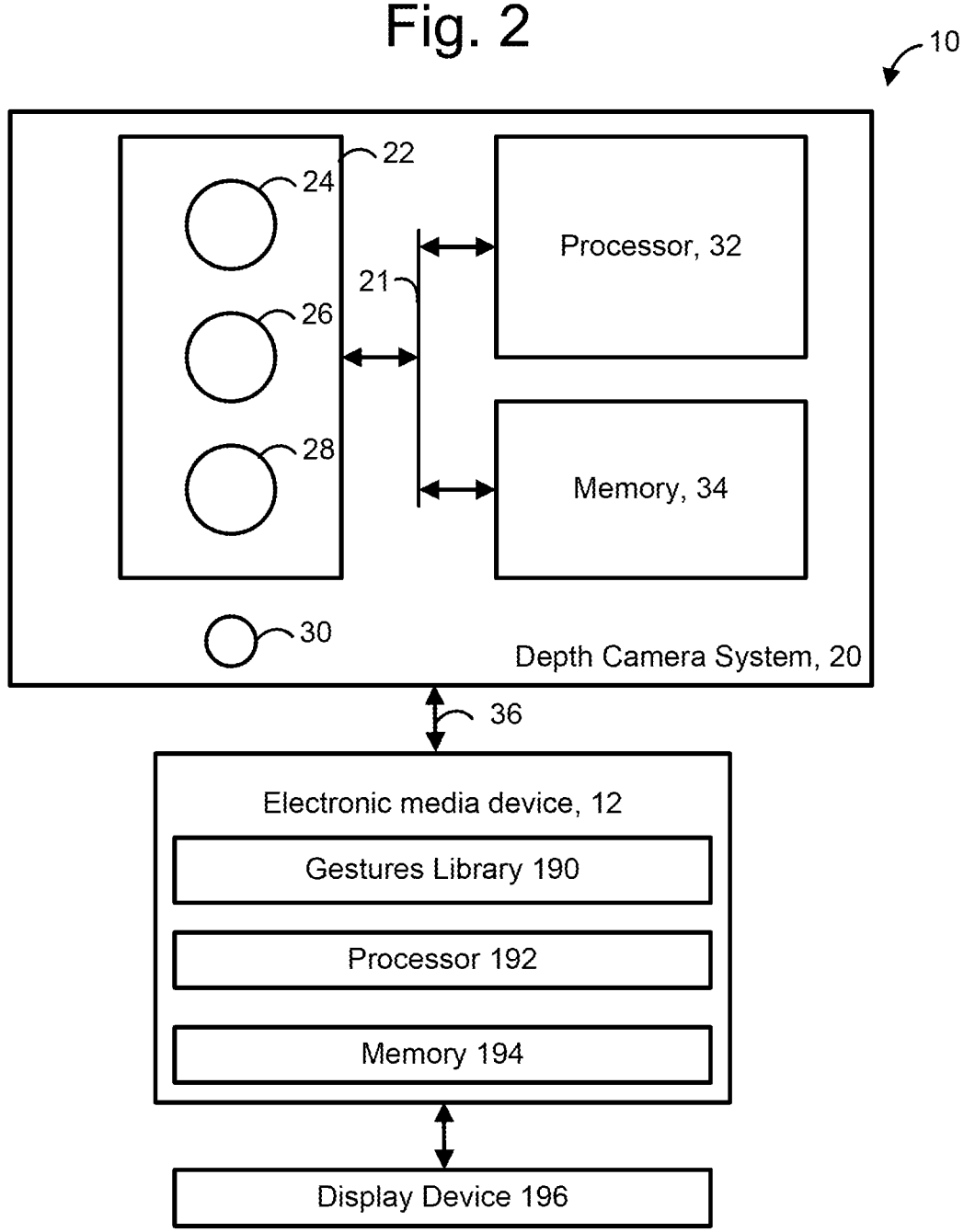

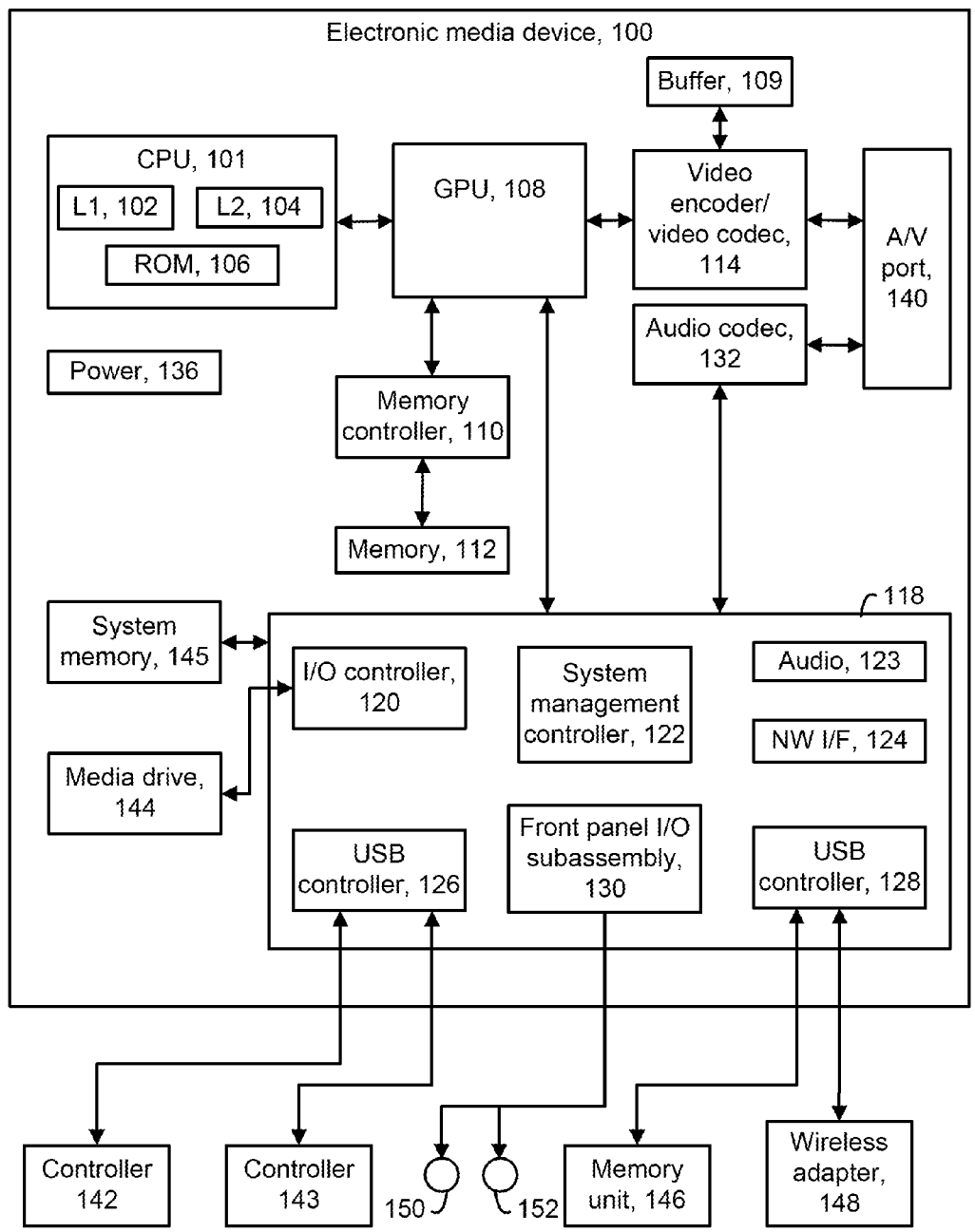

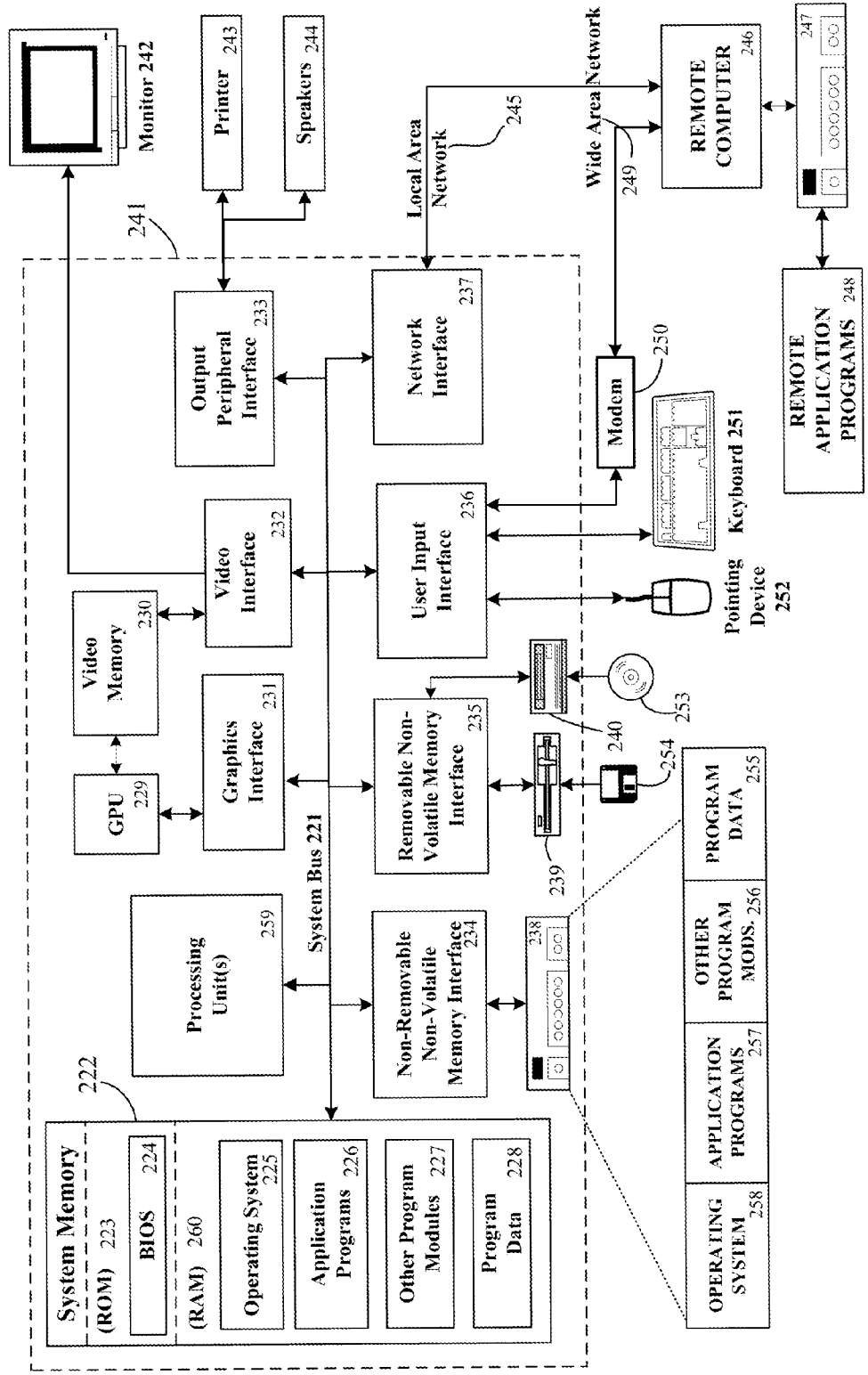

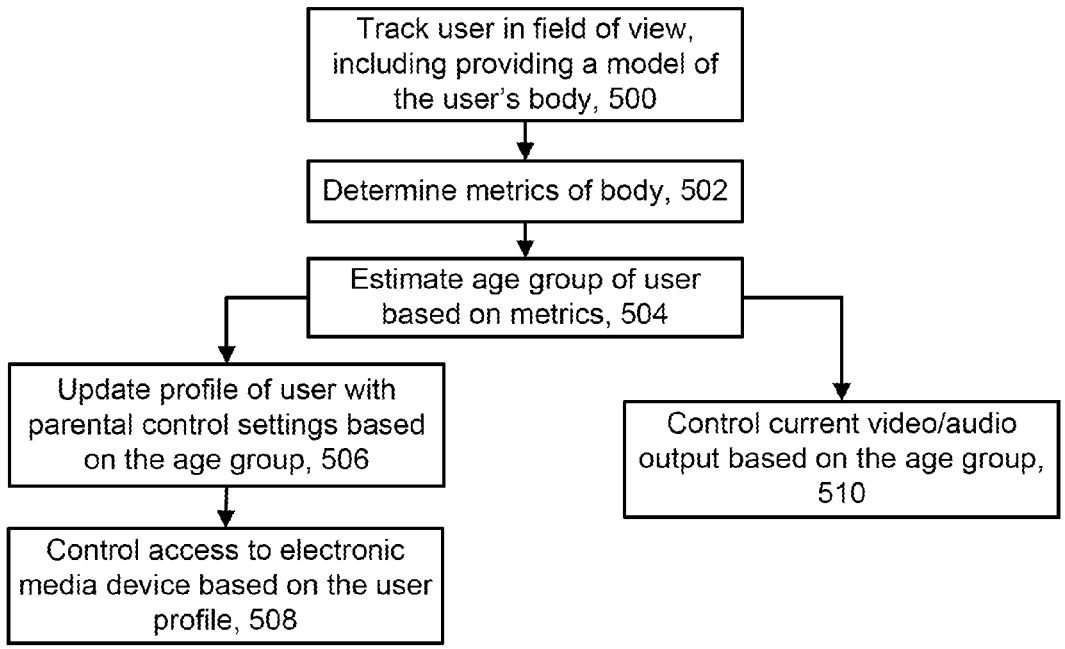
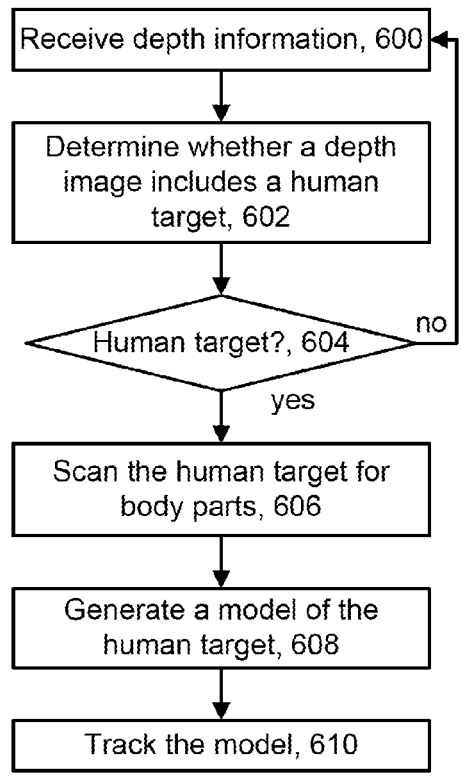
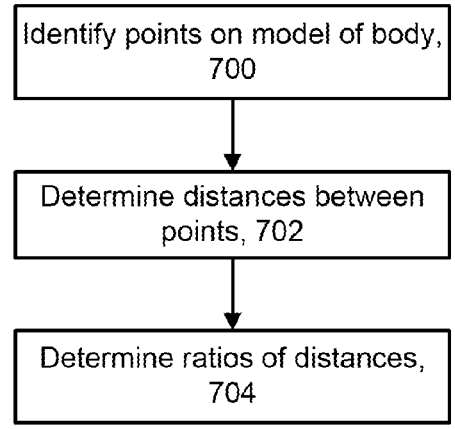

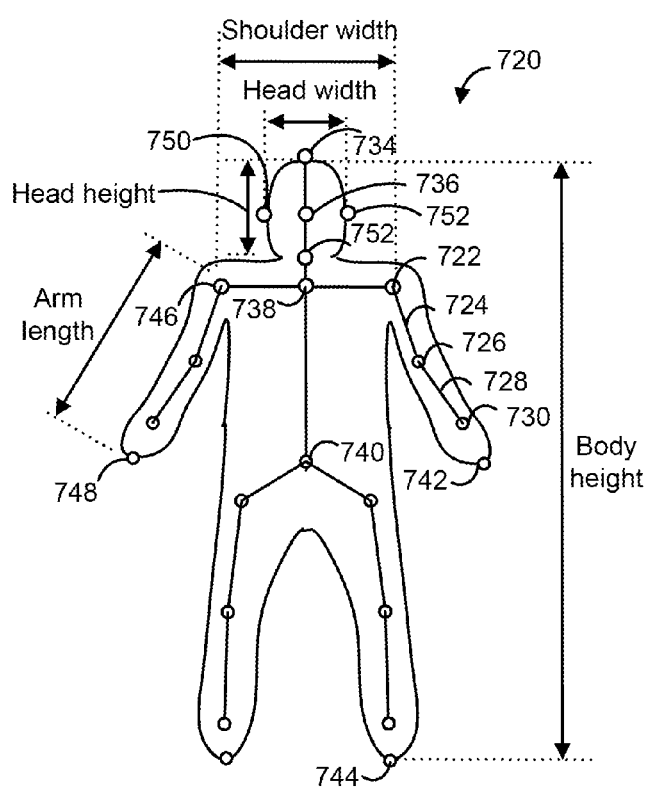
Fig. 7b
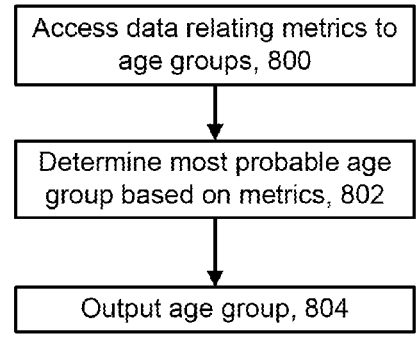
Fig. 8a
| Age group | Metric1 (M1) head width to shoulder ratio | Metric2 (M2) arm length to body height | Metric 3 (M3) body height to head height |
|---|---|---|---|
| 0-6 years | M1v1-M1v2 | M2v1-M2v2 | M3v1-M3v2 |
| 7-16 years | M1v2-M1v3 | M2v2-M2v3 | M3v2-M3v3 |
| 18+ years | M1v3-M1v4 | M2v3-M2v4 | M3v3-M3v4 |
Fig. 8b

Fig. 9c

| Today | 10:00 PM | 10:30 PM | 11:00 PM | 11:30 PM |
|---|---|---|---|---|
| 35 FOOD | Dinner:Imposs... | Dinner:Imposs... | Good Eats | 30 Minute Meals |
| 36 FX-N | That '70s Show | That '70s Show | Damages | |
| 37 TNT | Forrest Gump | | In Good Company | |
| 38 ESPN | Soccer | | SportsCenter | |
| 39 SPICE | ///////// | ///////// | ///////// | ///////// |
| 40 FSN | FSN Final | FSN Final | Best Sports Show | |

Fig. 9d

| Today | 10:00 PM | 10:30 PM | 11:00 PM | 11:30 PM |
|---|---|---|---|---|
| 35 FOOD | Dinner:Imposs... | Dinner:Imposs... | Good Eats | 30 Minute Meals |
| 36 FX-N | That '70s Show | That '70s Show | Damages | |
| 37 TNT | Forrest Gump | | In Good Company | |
| 38 ESPN | Soccer | | SportsCenter | |
| 40 FSN | FSN Final | FSN Final | Best Sports Show | |

PARENTAL CONTROL SETTINGS BASED ON BODY DIMENSIONS

BACKGROUND

Motion capture systems obtain data regarding the location and movement of a human or other subject in a physical space, and can use the data as an input to an application in an electronic media device, such as a game console with Internet connectivity. For instance, the motion of a human can be mapped to a three-dimensional (3-D) human skeletal model and used to create an animated character or avatar, or provide some other control input to the application. However, the electronic media device can expose the user to a wide variety of content and activities. There is a need to control access to the electronic media device to protect a user from inappropriate content and activities.

SUMMARY

A processor-implemented method, motion capture system and tangible computer readable storage are provided for controlling access to an electronic media device.

To facilitate controlling access to an electronic media device, a technique is provided which automatically determines an age group of a user in a field of view of a camera. The user's body is tracked in the field of view and used to obtain a 2-D or 3-D body model. Various metrics can be obtained from the 3-D model and correlated with a specific age group, based on ontogeny of the human body. Based on the age group, a profile of the user can be automatically updated with various parental control settings which control access to the electronic media device.

In one embodiment, a processor-implemented method for controlling access to an electronic media device is provided. The method includes a number of processor-implemented steps. The method includes tracking a body of a person in a field of view of a camera, including determining a model of the body. The model can be a 2-D or 3-D skeletal model, for instance, obtained using a 2-D camera or a 3-D camera. The 3-D camera may be in a motion capture system. The method further includes determining at least one metric of the body, based on the model. The metric can relate to, e.g., a relative size of a head of the body, a ratio of arm length to body height, a ratio of body height to head height, and/or a ratio of head width to shoulder width. The metrics provided herein are particularly indicative of age group. The method further includes estimating an age group of the person based on the at least one metric. For instance, each age group can be associated with a different ranges of values for a metric. Based on the estimated age group, the method includes updating a profile of the user at the electronic media device with one or more parental control settings.

Another aspect relates to tracking a body of a person which enters a field of view of a motion capture system, determining that restricted audio and/or video content which is currently presented is incompatible with an estimated age group of the person, and presenting substitute audio and/or video content which is compatible with the estimated age group, in place of the restricted audio and/or video content.

Subsequently, the person is tracked exiting the field of view of the motion capture system, and presenting of the restricted audio and/or video content is resumed at a particular point at which it was paused when the substitute audio and/or video content was presented.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

In the drawings, like-numbered elements correspond to one another.

FIG. 2 depicts an example block diagram of the motion capture system of FIG. 1.

FIG. 3 depicts an example block diagram of a computing environment that may be used in the motion capture system of FIG. 1.

FIG. 4 depicts another example block diagram of a computing environment that may be used in the motion capture system of FIG. 1.

FIG. 5 depicts a method for controlling access to an electronic media device in a motion capture system.

FIG. 6 depicts an example method for tracking movement of a person as set forth in step 500 of FIG. 5.

FIG. 7a depicts details of determining metrics of a body (step 502 of FIG. 5).

FIG. 7b depicts an example of a body model and metrics associated with the process of FIG. 7a.

FIG. 8a depicts details of estimating an age group of a user based on metrics (step 504 of FIG. 5).

FIG. 8b depicts an example table for correlating age group with body metrics.

FIG. 9c depicts an on-screen program guide in which a listing for restricted content is grayed out.

FIG. 9d depicts an on-screen program guide in which a listing for restricted content does not appear.

DETAILED DESCRIPTION

Techniques are provided for controlling access to an electronic media device. A depth camera system can track the movement of a user's body in a physical space and derive a model of the body, which is updated for each camera frame, several times per second. The model can be processed to identify metrics which indicate an absolute or relative size of different portions of the body. Based on the metrics, an age group of the user is determined and parent control settings can be implemented.

Implementing parental controls and the applying content restrictions based on those controls can require a relatively advanced understanding of an electronic media device such as a computer, TV, set-top box or game console system, to apply an appropriate level of content restriction. As an example, on a personal computer (PC), the user might need to set up a new user account, add parental control settings to it, and then select the appropriate content rating level. This can be a difficult task for most casual computer users. In many cases, particularly in the case of game console usage, the children are more tech savvy than their parents, and may be able to circumvent any control settings made by the parent. Also, the content restrictions (if any) are based solely on the person actively logged in to the electronic media device, and does not take in to account any other persons who may be able to view content.

The techniques provided herein include making an age-related assessment of all targets in a field of view based on combining various body scale ratios, application of content rating or other parental control settings based on assessment of age, a capability to override the system for known/higher privileged users, and a capability to override the system based on use of an administrator password or equivalent.

Figure 1:
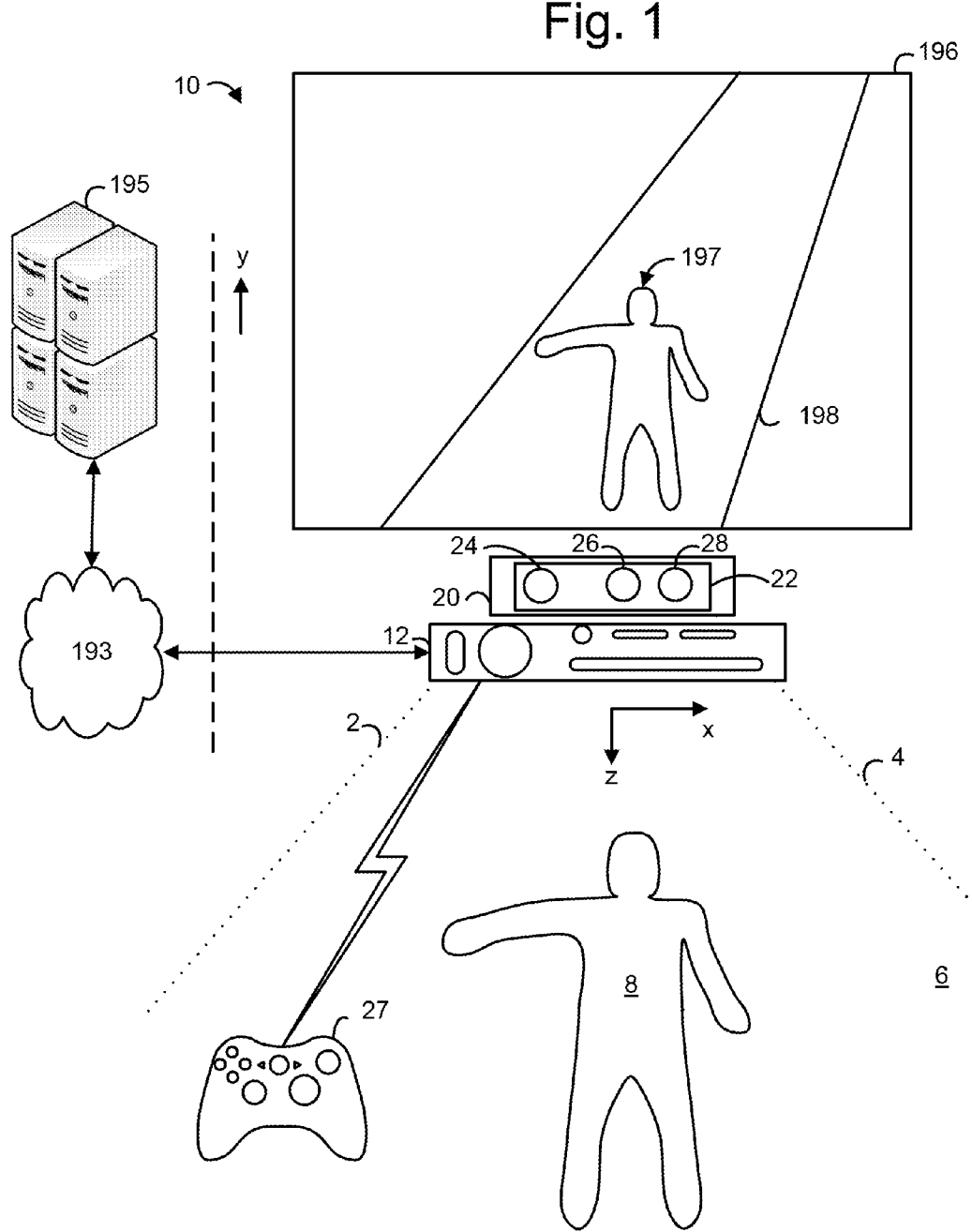
FIG. 1 depicts an example embodiment of a motion capture system.

FIG. 1 depicts an example embodiment of a motion capture system 10 in which a person 8 interacts with an application. The motion capture system 10 includes a display 196, a depth camera system 20, and an electronic media device 12 such as a PC, networked television, game console or the like. In some cases, the depth camera system 20 can be integrated into the electronic media device 12. The electronic media device 12 may be considered to be part of computing environment or apparatus. The depth camera system 20 may include an image camera component 22 having an infrared (IR) light emitter 24, an infrared camera 26, and a red-green-blue (RGB) camera 28. A 3-D camera may be made up of the IR light emitter 24 and the infrared camera 26. A user 8, also referred to as a person or player, stands in a field of view 6 of the depth camera. Lines 2 and 4 denote a boundary of the field of view 6. In this example, the depth camera system 20, and electronic media device 12 provide an application in which an avatar 197 on the display 196 track the movements of the user 8. For example, the avatar may raise an arm when the user raises an arm. The avatar 197 is standing on a road 198 in a 3-D virtual world. A Cartesian world coordinate system may be defined which includes a z-axis which extends along the focal length of the depth camera system 20, e.g., horizontally, a y-axis which extends vertically, and an x-axis which extends laterally and horizontally. Note that the perspective of the drawing is modified as a simplification, as the display 196 extends vertically in the y-axis direction and the z-axis extends out from the depth camera system, perpendicular to the y-axis and the x-axis, and parallel to a ground surface on which the user 8 stands.

Generally, the motion capture system 10 is used to recognize, analyze, and/or track a human target. The electronic media device 12 can include a computer, a gaming system or console, or the like, as well as hardware components and/or software components to execute applications.

The depth camera system 20 may include a camera which is used to visually monitor one or more people, such as the user 8, such that gestures and/or movements performed by the user may be captured, analyzed, and tracked to perform one or more controls or actions within an application, such as animating an avatar or on-screen character or selecting a menu item in a user interface (UI).

The motion capture system 10 may be connected to an audiovisual device such as the display 196, e.g., a television, a monitor, a high-definition television (HDTV), or the like, or even a projection on a wall or other surface, that provides a visual and audio output to the user. An audio output can also be provided via a separate device. To drive the display, the computing environment 12 may include a video adapter such as a graphics card and/or an audio adapter such as a sound card that provides audiovisual signals associated with an application. The display 196 may be connected to the computing environment 12 via, for example, an S-Video cable, a coaxial cable, an HDMI cable, a DVI cable, a VGA cable, or the like.

The user 8 may be tracked using the depth camera system 20 such that the gestures and/or movements of the user are captured and used to animate an avatar or on-screen character and/or interpreted as input controls to the application being executed by computer environment 12.

However, techniques for controlling access to an electronic media device as described herein do not require the user to provide a control input by movement of the body. While the techniques are compatible with the user providing a control input by movement of the body, it is also possible for the user to operate a handheld, wireless controller 27, such as a game console controller or a typical television remote controller, to provide control inputs to the electronic media device 12.

The electronic media device 12 may have network connectivity so that it can connect to one or more servers 195 via one or more networks 193. In this manner, the user can interact with other, remote users as well as obtain content, such as by viewing and/or downloading of video/audio content, and participate in other online activities including shopping, browsing, social media and multiplayer gaming.

The dashed line represents a boundary of the user's premises such as his or her home.

FIG. 2 depicts an example block diagram of the motion capture system 10 of FIG. 1a. The depth camera system 20 may be configured to capture video with depth information including a depth image that may include depth values, via any suitable technique including, for example, time-of-flight, structured light, stereo image, or the like. The depth camera system 20 may organize the depth information into "Z layers," or layers that may be perpendicular to a Z axis extending from the depth camera along its line of sight.

The depth camera system 20 may include an image camera component 22, such as a depth camera that captures the depth image of a scene in a physical space. The depth image may include a two-dimensional (2-D) pixel area of the captured scene, where each pixel in the 2-D pixel area has an associated depth value which represents a linear distance from the image camera component 22.

The image camera component 22 may include an infrared (IR) light emitter 24, an infrared camera 26, and a red-green-blue (RGB) camera 28 that may be used to capture the depth image of a scene. A 3-D camera is formed by the combination of the infrared emitter 24 and the infrared camera 26. For example, in time-of-flight analysis, the IR light emitter 24 of the depth camera system 20 may emit an infrared light onto the physical space and use sensors (not shown) to detect the backscattered light from the surface of one or more targets and objects in the physical space using, for example, the infrared camera 26 and/or the RGB camera 28. In some embodiments, pulsed infrared light may be used such that the time between an outgoing light pulse and a corresponding incoming light pulse is measured and used to determine a physical distance from the depth camera system 20 to a particular location on the targets or objects in the physical space. The phase of the outgoing light wave may be compared to the phase of the incoming light wave to determine a phase shift. The phase shift may then be used to determine a physical distance from the depth camera system to a particular location on the targets or objects.

A time-of-flight analysis may also be used to indirectly determine a physical distance from the depth camera system 20 to a particular location on the targets or objects by analyzing the intensity of the reflected beam of light over time via various techniques including, for example, shuttered light pulse imaging.

In another example embodiment, the depth camera system 20 may use a structured light to capture depth information. In such an analysis, patterned light (i.e., light displayed as a known pattern such as grid pattern or a stripe pattern) may be projected onto the scene via, for example, the IR light emitter 24. Upon striking the surface of one or more targets or objects in the scene, the pattern may become deformed in response. Such a deformation of the pattern may be captured by, for example, the infrared camera 26 and/or the RGB camera 28 and may then be analyzed to determine a physical distance from the depth camera system to a particular location on the targets or objects.

The depth camera system 20 may include two or more physically separated cameras that may view a scene from different angles to obtain visual stereo data that may be resolved to generate depth information.

A microphone 30 includes, e.g., a transducer or sensor that receives and converts sound waves into an electrical signal. Additionally, the microphone 30 may be used to receive audio signals such as sounds that are provided by a person to control an application that is run by the computing environment 12. The audio signals can include vocal sounds of the person such as spoken words, whistling, shouts and other utterances as well as non-vocal sounds such as clapping hands or stomping feet.

A processor 32 is in communication with the image camera component 22. The processor 32 may include a standardized processor, a specialized processor, a microprocessor, or the like that may execute instructions including, for example, instructions for receiving a depth image; generating a grid of voxels based on the depth image; removing a background included in the grid of voxels to isolate one or more voxels associated with a human target; determining a location or position of one or more extremities of the isolated human target; adjusting a model based on the location or position of the one or more extremities, or any other suitable instruction, which will be described in more detail below.

A memory component 34 may store instructions that are executed by the processor 32, as well as storing images or frames of images captured by the 3-D camera or RGB camera, or any other suitable information, images, or the like. The memory component 34 may include random access memory (RAM), read only memory (ROM), cache, Flash memory, a hard disk, or any other suitable tangible computer readable storage component. The memory component 34 may be a separate component in communication with the image capture component 22 and the processor 32 via a bus 21. Or, the memory component 34 may be integrated into the processor 32 and/or the image capture component 22.

The depth camera system 20 may be in communication with the electronic media device via a communication link 36, such as a wired and/or a wireless connection. The computing environment 12 may provide a clock signal to the depth camera system 20 via the communication link 36 that indicates when to capture image data from the physical space which is in the field of view of the depth camera system 20.

Additionally, the depth camera system 20 may provide the depth information and images captured by, for example, the 3-D camera 26 and/or the RGB camera 28, and/or a skeletal model that may be generated by the depth camera system 20 to the computing environment 12 via the communication link 36. The computing environment 12 may then use the model, depth information, and captured images to control an application. For example, the electronic media device 12 may include a gestures library 190, such as a collection of gesture filters, each having information concerning a gesture that may be performed by the skeletal model (as the user moves). For example, a gesture filter can be provided for various hand gestures, such as swiping or flinging of the hands. By comparing a detected motion to each filter, a specified gesture or movement which is performed by a person can be identified. An extent to which the movement is performed can also be determined.

The data captured by the depth camera system 20 in the form of the skeletal model and movements associated with it may be compared to the gesture filters in the gesture library 190 to identify when a user (as represented by the skeletal model) has performed one or more specific movements. Those movements may be associated with various controls of an application.

The computing environment may also include a processor 192 for executing instructions which are stored in a memory 194 to provide audio-video output signals to the display device 196 and to achieve other functionality as described herein.

The memory 34 and 194 can be considered to be tangible computer readable storage having computer readable software embodied thereon for programming the one or more processors 32 and 192, respectively, to perform a method for controlling access to an electronic media device. Further, the one or more processors 32 and 192 can provide a processor-implemented method for controlling access to an electronic media device, comprising processor-implemented steps as described herein.

FIG. 3 depicts an example block diagram of a computing environment that may be used by the electronic media device 12 of FIG. 1. The computing environment may include a electronic media device 100, such as a gaming console with Internet connectivity. A central processing unit (CPU) 101 has a level 1 (L1) cache 102, a level 2 (L2) cache 104, and a flash ROM (Read Only Memory) 106. The L1 cache 102 and L2 cache 104 temporarily store data and hence reduce the number of memory access cycles, thereby improving processing speed and throughput. The CPU 101 may have more than one core, and thus, additional level 1 and level 2 caches 102 and 104. The flash ROM 106 may store executable code that is loaded during an initial phase of a boot process when the electronic media device 100 is powered on.

A graphics processing unit (GPU) 108 and a video encoder/video codec (coder/decoder) 114 form a video processing pipeline for high speed and high resolution graphics processing. The coder/decoder 114 may access a buffer 109 for buffering frames of video. Data is carried from the GPU 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as RAM (Random Access Memory).

The electronic media device 100 includes an I/O controller 120, a system management controller 122, an audio processing unit 123, a network interface 124, a first USB host controller 126, a second USB controller 128 and a front panel I/O subassembly 130 that are preferably implemented on a module 118. The USB controllers 126 and 128 serve as hosts for peripheral controllers 142 and 143, such as the game controllers 20, 22 of FIG. 1, a wireless adapter 148, and an external memory unit 146 (e.g., flash memory, external CD/DVD ROM drive, removable media, etc.) The network interface (NW IF) 124 and/or wireless adapter 148 provide access to a network (e.g., the Internet, home network, etc.) and may include wired or wireless adapter components including an Ethernet card, a modem, a Bluetooth module, a cable modem, and the like.

System memory 145 is provided to store application data that is loaded during the boot process. A media drive 144 may comprise a DVD/CD drive, hard drive, or other removable media drive. The media drive 144 may be internal or external to the electronic media device 100. Application data may be accessed via the media drive 144 for execution, playback, etc. by the electronic media device 100. The media drive 144 is connected to the I/O controller 120 via a bus, such as a Serial ATA bus or other high speed connection.

The system management controller 122 provides a variety of service functions related to assuring availability of the electronic media device 100. The audio processing unit 123 and an audio codec 132 form an audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the electronic media device 100. A system power supply module 136 provides power to the components of the electronic media device 100.

The CPU 101, GPU 108, memory controller 110, and various other components within the electronic media device 100 are interconnected via one or more buses, including serial and parallel buses, a memory bus, a peripheral bus, and a processor or local bus using any of a variety of bus architectures.

When the electronic media device 100 is powered on, application data may be loaded from the system memory 145 into memory 112 and/or caches 102, 104 and executed on the CPU 101. The application may present a graphical user interface that provides a consistent user experience when navigating to different media types available on the electronic media device 100. In operation, applications and/or other media contained within the media drive 144 may be launched or played from the media drive 144 to provide additional functionalities to the electronic media device 100.

The electronic media device 100 may be operated as a standalone system by simply connecting the system to a television or other display. In this standalone mode, the electronic media device 100 allows one or more users to interact with the system, watch movies, or listen to music. However, with the integration of broadband connectivity made available through the network interface 124 or the wireless adapter 148, the electronic media device 100 may further be operated as a participant in a larger network community.

When the electronic media device 100 is powered on, a specified amount of hardware resources are reserved for system use by the electronic media device operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

After the electronic media device 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A electronic media device application manager controls the gaming application audio level (e.g., mute, attenuate) when system applications are active.

Input devices (e.g., controllers 142 and 143, such as the game console controller 27 of FIG. 1) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches.

The computing environment can include tangible computer readable storage having computer readable software embodied thereon for programming at least one processor to perform a method for controlling access to an electronic media device as described herein. The tangible computer readable storage can include, e.g., one or more of components 102, 104, 106, 112, 145 and 146. Further, one or more processors of the computing environment can provide a processor-implemented method for controlling access to an electronic media device, comprising processor-implemented steps as described herein. A processor can include, e.g., one or more of components 101 and 110.

FIG. 4 depicts another example block diagram of a computing environment that may be used by the electronic media device of FIG. 1. The computing environment 220 comprises a computer 241, which typically includes a variety of tangible computer readable storage media. This can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. A graphics interface 231 communicates with a GPU 229 which in turn communicates with a video memory 230. The video memory 230 may include a buffer. An operating system 225, application programs 226, other program modules 227, and program data 228 are provided.

The computer 241 may also include other removable/non-removable, volatile/nonvolatile computer storage media, e.g., a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile tangible computer readable storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and depicted, provide storage of computer readable instructions, data structures, program modules and other data for the computer 241. For example, hard disk drive 238 is depicted as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to depict that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A depth camera system used for detecting gestures may define additional input devices for the console 100. A monitor 242 or other type of display is also connected to the system bus 221 via an interface, such as a video interface 232. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a PC, a server, a router, a network PC, a peer device or other common network node, and typically includes many or all of the elements described above relative to the computer 241, although only a memory storage device 247 has been depicted. The logical connections include a local area network (LAN) 245 and a wide area network (WAN) 249, but may also include other networks. Such networking environments are commonplace in home networks, offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. Remote application programs 248 may reside on memory device 247. It will be appreciated that the network connections shown are exemplary and other means of establishing a communications link between the computers may be used.

The computing environment can include tangible computer readable storage having computer readable software embodied thereon for programming at least one processor to perform a method for controlling access to an electronic media device as described herein. The tangible computer readable storage can include, e.g., one or more of components 222, 234, 235, 230, 253 and 254. Further, one or more processors of the computing environment can provide a processor-implemented method for controlling access to an electronic media device, comprising processor-implemented steps as described herein. A processor can include, e.g., one or more of components 229 and 259.

FIG. 5 depicts a method for controlling access to an electronic media device in a motion capture system. Step 500 includes tracking a user in a field of view, including providing a model of the user's body. Additional details are provided in FIG. 6. Step 502 includes determining metrics of the user's body. Additional details are provided in FIGS. 7*a* and 7*b*. Step 504 includes estimating an age group of the user based on the metrics. Additional details are provided in FIGS. 8*a* and 8*b*. Step 506 includes updating a profile of the user with parental control settings based on the age group determined in step 504. Additional details are provided in FIGS. 9*a* and 9*b*. Step 508 includes controlling access to an electronic media device based on the user profile. This step essentially implements the controls which were defined in step 506 so that specified content or activities are allowed or disallowed. Step 510 includes controlling a current video/audio output based on the age group determined in step 504. Additional details are provided in FIGS. 10 and 11.

FIG. 6 depicts an example method for tracking movement of a person as set forth in step 500 of FIG. 5. The example method may be implemented using, for example, the depth camera system 20 and/or the electronic media device 12, 100 or the computing environment 220 as discussed in connection with FIGS. 1-4. One or more people can be scanned to generate a model such as a skeletal model, a mesh human model, or any other suitable representation of a person. In a skeletal model, each body part may be characterized as a mathematical vector defining joints and bones of the skeletal model. Body parts can move relative to one another at the joints.

The model may then be used to interact with an application that is executed by the computing environment. The scan to generate the model can occur when an application is started or launched, or at other times as controlled by the application of the scanned person.

The person may be scanned to generate a skeletal model that may be tracked such that physical movements or motions of the user may act as a real-time user interface that adjusts and/or controls parameters of an application. For example, the tracked movements of a person may be used to move an avatar or other on-screen character in an electronic role-playing game; to control an on-screen vehicle in an electronic racing game; to control the building or organization of objects in a virtual environment; or to perform any other suitable control of an application.

According to one embodiment, at step 600, depth information is received, e.g., from the depth camera system. The depth camera system may capture or observe a field of view that may include one or more targets. In an example embodiment, the depth camera system may obtain depth information associated with the one or more targets in the capture area using any suitable technique such as time-of-flight analysis, structured light analysis, stereo vision analysis, or the like, as discussed. The depth information may include a depth image having a plurality of observed pixels, where each observed pixel has an observed depth value, as discussed.

The depth image may be downsampled to a lower processing resolution so that it can be more easily used and processed with less computing overhead. Additionally, one or more high-variance and/or noisy depth values may be removed and/or smoothed from the depth image; portions of missing and/or removed depth information may be filled in and/or reconstructed; and/or any other suitable processing may be performed on the received depth information may such that the depth information may used to generate a model such as a skeletal model.

At decision step 602, a determination is made as to whether the depth image includes a human target. This can include flood filling each target or object in the depth image comparing each target or object to a pattern to determine whether the depth image includes a human target. For example, various depth values of pixels in a selected area or point of the depth image may be compared to determine edges that may define targets or objects as described above. The likely Z values of the Z layers may be flood filled based on the determined edges. For example, the pixels associated with the determined edges and the pixels of the area within the edges may be associated with each other to define a target or an object in the capture area that may be compared with a pattern, which will be described in more detail below.

If decision step 604 is true, step 606 is performed. If decision step 604 is false, additional depth information is received at step 600.

The pattern to which each target or object is compared may include one or more data structures having a set of variables that collectively define a typical body of a human. Information associated with the pixels of, for example, a human target and a non-human target in the field of view, may be compared with the variables to identify a human target. In one embodiment, each of the variables in the set may be weighted based on a body part. For example, various body parts such as a head and/or shoulders in the pattern may have weight value associated therewith that may be greater than other body parts such as a leg. According to one embodiment, the weight values may be used when comparing a target with the variables to determine whether and which of the targets may be human. For example, matches between the variables and the target that have larger weight values may yield a greater likelihood of the target being human than matches with smaller weight values.

Step 606 includes scanning the human target for body parts. The human target may be scanned to provide measurements such as length, width, or the like associated with one or more body parts of a person to provide an accurate model of the person. In an example embodiment, the human target may be isolated and a bitmask of the human target may be created to scan for one or more body parts. The bitmask may be created by, for example, flood filling the human target such that the human target may be separated from other targets or objects in the capture area elements. The bitmask may then be analyzed for one or more body parts to generate a model such as a skeletal model, a mesh human model, or the like of the human target. For example, according to one embodiment, measurement values determined by the scanned bitmask may be used to define one or more joints in a skeletal model. The one or more joints may be used to define one or more bones that may correspond to a body part of a human.

For example, the top of the bitmask of the human target may be associated with a location of the top of the head. After determining the top of the head, the bitmask may be scanned downward to then determine a location of a neck, a location of the shoulders and so forth. A width of the bitmask, for example, at a position being scanned, may be compared to a threshold value of a typical width associated with, for example, a neck, shoulders, or the like. In an alternative embodiment, the distance from a previous position scanned and associated with a body part in a bitmask may be used to determine the location of the neck, shoulders or the like. Some body parts such as legs, feet, or the like may be calculated based on, for example, the location of other body parts. Upon determining the values of a body part, a data structure is created that includes measurement values of the body part. The data structure may include scan results averaged from multiple depth images which are provide at different points in time by the depth camera system.

Step 608 includes generating a model of the human target. In one embodiment, measurement values determined by the scanned bitmask may be used to define one or more joints in a skeletal model. The one or more joints are used to define one or more bones that correspond to a body part of a human.

One or more joints may be adjusted until the joints are within a range of typical distances between a joint and a body part of a human to generate a more accurate skeletal model. The model may further be adjusted based on, for example, a height associated with the human target.

At step 610, the model is tracked by updating the person's location several times per second. As the user moves in the physical space, information from the depth camera system is used to adjust the skeletal model such that the skeletal model represents a person. In particular, one or more forces may be applied to one or more force-receiving aspects of the skeletal model to adjust the skeletal model into a pose that more closely corresponds to the pose of the human target in physical space.

Generally, any known technique for tracking movements of a person can be used.

FIG. 7a depicts details of determining metrics of a body (step 502 of FIG. 5). Step 700 includes identifying points on the model of the body. The points can be joints of a skeletal model and/or other points, such as the top of the head, center of the head, tip of the hand, and tip of the foot. Step 702 includes determining distances between the points. For example, the distances can identify a shoulder width, head width, head height, arm length and body height. Step 704 includes determines ratios of the distances, such as a ratio which indicates a relative size of a head of the body, a ratio of arm length to body height, a ratio of body height to head height, and/or a ratio of head width to shoulder width.

FIG. 7b depicts an example of a body model and metrics associated with the process of FIG. 7a. The body model 720 is based on a skeleton which has a number of joints and bones. For example, an upper arm bone 724 extends between a shoulder joint 722 and an elbow joint 726, and a lower arm bone 728 extends between the elbow joint 726 and a wrist joint 730. Other example points include the top of the head 734, center of the head 736, sides of head 750, 752, bottom of the head 752, center of the upper torso 738, center of the lower torso 740, tip of the hand 742, 748, and tip of the foot 744. The shoulder width can be the distance between the shoulder joint 746 and the hand tip 748. The head width can be the distance between the points 750 and 752. The head height can be the distance between points 734 and 752. The arm length can be the distance between points 722 and 742, or between points 746 and 748. The body height can be the distance between points 734 and 744. For some metrics, the measurement can be made in more than one way. For example, arm length can be determined by measuring the length of either arm. In some cases, a metric may be obtained that is not consistent with other metrics. In this case, the other metrics can be relied on if they are consistent with one another or otherwise are believed to be more reliable.

FIG. 8a depicts details of estimating an age group of a user based on metrics (step 504 of FIG. 5). Step 800 includes accessing data relating metrics to age group. Step 802 includes determining a most probable age group based on the metrics. Step 804 includes outputting the age group to one or more processes which enforce age-related restrictions on accessing an electronic media device.

The human body typically develops such that at different ages, different portions of the body have different size ratios.

For example, compared to an adult, a child will tend to have a larger head width to shoulder ratio, and a smaller arm or torso length to overall body height ratio. The ratio of leg length to overall height will be larger since the legs tend to grow faster than the arms or torso. A smaller body height to head height ratio (larger head height to body height), is also associated with a younger age, as is lower overall height and body mass. Stated conversely, an adult will tend to have a smaller head width to shoulder width ratio, a larger arm or torso length to overall height ratio, and the ratio of leg length to overall height will be smaller. A larger body height to head height ratio, and larger overall body height and body mass is also correlated with an older age. Head width is correlated to head height and can be substituted in the above statements. Metrics which are derivable from, and proportionate to, the above-mentioned metrics can also be substituted in the above statements. For example, head volume is derivable from head width and/or height. Further, the use of a ratio (e.g., head width to shoulder width) or the inverse of the ratio (e.g., shoulder width to head width), is equivalent.

A number of age groups can be defined which correspond to specific bodily metrics. For example, four age groups may be defined: a child of 0-6 years, a child of 7-12 years, a teenager of 13-17 years and an adult of 18 or more years. In another approach, three age groups are defined: a child of 0-6 years, a child of 7-16 years and a teenager/adult of 17 or more years. In another approach, two age groups are defined: a child of 0-12 years, and a child/teenager/adult of 13 or more years. Many variations are possible. Each age group corresponds to a range of values for each of the metrics, as illustrated in the example implementation of FIG. 8$b$.

While there are natural variations in body types or absolute scale, combining several factors should allow a relatively accurate estimation of target age based on body proportions.

FIG. 8$b$ depicts an example table for correlating age group with body metrics. For an age group 0-6 years, metric1 (M1), such as head width to shoulder width ratio, has a range of values which are depicted generically as $M1v1$-$M1v2$, metric2 (M2), such as arm length to body height, has a range of values $M2v1$-$M2v2$, and metric3 (M3), such as body height to head height, has a range of values $M3v1$-$M3v2$. Similarly, for an age group 7-16 years, M1 has a range of values $M1v2$-$M1v3$, M2 has a range of values $M2v2$-$M2v3$, and M3 has a range of values $M3v2$-$M3v3$. For an age group of 18+ years, M1 has a range of values $M1v3$-$M1v4$, M2 has a range of values $M2v3$-$M2v4$, and M3 has a range of values $M3v3$-$M3v4$. The specific values to be used can be obtained from known studies regarding human growth, measurements and/or testing. For example, see Snyder, R. G., Spencer, M. L., Owings, C. L. & Schneider, L. W., Physical Characteristics of Children As Related to Death and Injury for Consumer Product Design and Use, Prepared for the Consumer Product Safety Commission (UM-HSRI-BI-75-5 Final Report Contract FDA-72-70 May 1975), Highway Safety Research Institute, The University of Michigan, May 31, 1975, incorporated herein by reference. The data set of this study sampled body measurements of children from 2 weeks to 13 years of age.

An example implementation can use metrics including:
(1) Height
(2) Head size (e.g., height)
  <3 yrs=6 inches or below
  5-15 yrs=approximately 7 inches
  >15 yrs=9 inches+
(3) Ratio of head size to height
  Adult=8 heads tall, with a head size of 9 inches
  15 year old=7½ heads tall with a head size of 9 inches
  10 year old=7 heads tall with a head size of 7½ inches
  5 years old=6 heads tall with a head size of 7 inches
  3 years old=5 heads tall with a head size of 6½ inches
  1 year old=4 heads tall with a head size of 6 inches
(4) Ratio of shoulder width to head width
  Head:shoulder<1:2=5 years or younger
  Head:shoulder>1:3=15 yrs or older
  Middle ratio (1.2-1.3)=5-15 yrs
(5) Ratio of arm length to body length
  Children's arms are shorter, generally extending only to just below the hips. Adult arm length typically extends to mid-upper thigh.
(6) Ratio of body surface area to weight
  Infant ratio is approximately 2× adult ratio As mentioned, when the metrics for one user correlate with different age groups, the metrics which correlate with one another or which are otherwise believed to be reliable can be used to determine an age group. A conservative policy may be implemented by assuming that a younger age group applies if the age group cannot be determined with a high probability. For example, if one or more metrics correlate to ages 0-6 and one or more metrics correlate to ages 7-16, ages 0-6 may be output as the identified age group. In other cases, a majority vote among the metrics can be used. For example, if M1 correlates to ages 0-6, and M2 and M3 correlate to ages 7-16, ages 7-16 may be output as the identified age group. In another approach, different weights can be applied to different metrics. A metric which is a more accurate and reliable predictor of age can be assigned a greater weight than a metric which is a less accurate and reliable predictor of age.

Generally, one or more metrics can be used to determine the age group. Combining multiple metrics can allow for a higher accuracy of estimation of the age of a target. By using a full body map of users who are within the field of view of a camera, and ratio analysis of human bodies, it is possible to determine with good accuracy whether an individual is a child or an adult, and to make an estimation of their age. Note that the age estimation can occur for one or more users in the field of view. Furthermore, an estimation can be based on a 2-D or 3-D image. A 3-D image has the advantage of providing depth data so that absolute distances such as height and length measurements can be obtained. Moreover, the use of metrics relating to body proportions can be more reliable than other approaches such as those which analyze facial features such as skin texture or the relative location of the eyes, nose and mouth, because such features often cannot be determined with accuracy and consistency and are not as strongly correlated with age. Such approaches typically do not use a body model which is based on a skeletal model and a 3-D depth map, in which the entire body or a large portion of the body is modeled to determine the relative size of body parts.

The number of age groups, and the specific ages of each group, can be based on content ratings which are common in the industry. For instance, the Motion Picture Academy of America provides ratings of: G, PG, PG-13, R and NC-17 for movies. A G-rated motion picture is suitable for children. A PG-rated motion picture may have some material unsuitable for children. A PG-13 rated motion picture has more mature content than the PG-rated motion picture. An R-rated motion picture contains some adult material. An NC-17 rated motion picture is not suitable for children age 17 and under. Thus, under this ratings scheme, an age group of 0-12 years can be allowed access to content with G and PG ratings, an age group of 13-17 years can be allowed access to content with G, PG and PG-13 ratings, and an age group of 18+ years can be allowed access to content with G, PG, PG-13, R and NC-17 ratings could be used.

Television parental guidelines in the United States include: TV-Y for content suitable for all children, TV-Y7 for content suitable for children 7 and older, TV-Y7-FV for content that contains fantasy violence and is suitable for children 7 and older, TV-G for content that is suitable for a general audience, and TV-PG for content that may be unsuitable for younger children without the guidance of a parent. The TV-PG rating may be accompanied by one or more of the following sub-ratings: D for some suggestive dialogue, L for infrequent coarse language, S for some sexual situations and V for moderate violence. TV-14 denotes content that may be unsuitable for children under 14 years of age, and may be accompanied by the D, L, S and V sub-ratings. TV-MA denotes content for a mature audience which may be unsuitable for children under 17, and may be accompanied by the L, S and V sub-ratings. Under this rating scheme, an age group of 0-6 years could be allowed access to content with a rating of TV-Y, an age group of 7-13 years could be allowed access to content with a rating of TV-Y, TV-Y7, TV-Y7-FV, TV-G and TV-PG, an age group of 14-16 years could be allowed access to content with a rating of TV-Y, TV-Y7, TV-Y7-FV, TV-G, TV-PG and TV-14, and an age group of 17+ years could be allowed access to content with a rating of TV-Y, TV-Y7, TV-Y7-FV, TV-G, TV-PG TV-14 and TV-MA.

Similarly, the Entertainment Software Rating Board provides ratings for computer and video games. The ratings include EC for early childhood, representing content that may be suitable for ages 3 and older. Titles rated E (Everyone) have content that may be suitable for ages 6 and older. Titles rated E10+ (Everyone 10 and older) have content that may be suitable for ages 10 and older. Titles rated T (Teen) have content that may be suitable for ages 13 and older. Titles rated M (Mature) have content that may be suitable for persons ages 17 and older. Titles rated AO (Adults Only) have content that should only be played by persons 18 years and older. Thus, under this ratings scheme, an age group of 3-5 years could be allowed access to content with a rating of EC, an age group of 6-9 years could be allowed access to content with a rating of EC and E, an age group of 10-12 years could be allowed access to content with a rating of EC, E and E10+, an age group of 13-16 years could be allowed access to content with a rating of EC, E, E10+ and T and an age group of 17+ years could be allowed access to content with a rating of EC, E, E10+, T, M and AO.

The rating of content can be decoded by the electronic media device from a predefined data field in the content.

Note that a given user can be classified into different age groups based on the specific access to the electronic media which is at issue. For instance, a user could be classified into an age group of 13-17 for accessing a movie, so that a movie with a rating of G, PG, or PG-13 could be accessed by the user without restriction, and a group of 13-16 for accessing a computer game, so that a rating of E, E10+ and T could be accessed by the user without restriction. Or, a user could be classified into an age group of 0-12 for accessing a movie, so that a movie with a rating of G could be accessed by the user without restriction, and a group of 10-12 for accessing a computer game, so that a rating of E or E10+ could be accessed by the user without restriction.

Figure 9A:
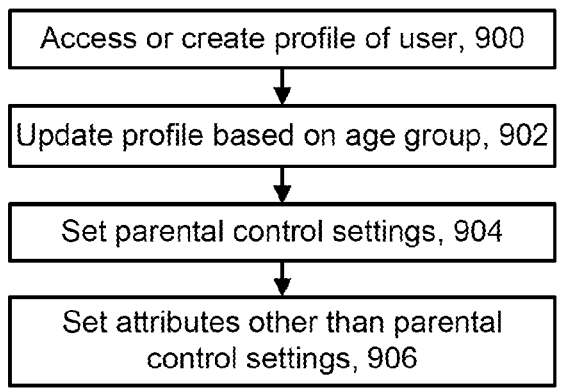
FIG. 9a depicts details of updating a profile of a user with parental control settings (step 506 of FIG. 5).

FIG. 9a depicts details of updating a profile of a user with parental control settings (step 506 of FIG. 5). Step 900 includes accessing or creating a profile of a user. A profile of a user may be available at an electronic media device, such as when a user has previously used the electronic media device and has provided identifying information. The profile may include a name or nickname of the user, and attributes. If a profile is not available and the user is considered to be a new user, a new profile can be created. Thus, if a user is already known to the electronic media device, the user may have parental controls or content rating restrictions already associated with the user's profile. One approach allows for that information to be used preferentially, if appropriate, over a detected age group of the user, to avoid being overly restricted.

Moreover, an override capability can be provided. For example, an administrator such as a parent can enter his or her password to override the restrictions which are automatically imposed based on the detected age group, and provide their own preferred settings. In some cases, the automatically imposed restrictions may not be appropriate because the age group detection process is not 100% accurate, and because some user's ontogeny does not reflect their actual age. Further, some parents may be more or less permissive and can choose to set the restrictions accordingly. In one possible approach, the parent can provide a setting which provides an up rating or down rating relative to the automatically determined rating. For instance, for a child who is considered by the parent to be less mature, or for stricter than average parents, the parent can set a down rating so that the automatically determined rating is reduced by one level, or by a specified number of levels, more generally. As an example, if a child is determined to be an in age group for which a computer game with a rating of E, E10+ or T would nominally allowed, according to default settings, a down rating would only allow the child to access a computer game with a rating of E or E10+, but not T. In another example, for a child who is considered by the parent to be more mature, or for more lenient than average parents, the parent can set an up rating so that the automatically determined rating is increased by one level. As an example, if a child is determined to be an in age group for which a computer game with a rating of E, E10+ or T would nominally allowed, according to default settings, an up rating would allow the child to access a computer game with a rating of E, E10+ and T as well as M.

Step 902 includes updating the profile based on the age group. The profile can have an age group associated with one or more attributes. One can augment information which is already contained in a user's profile with age related characteristics that determine settings for a content rating system which is present at the electronic media device. The profile need not be used immediately to determine whether specific content can be accessed, or whether a restricted activity can be performed.

Step 904 includes setting parental controls, based on the age group. A number of different controls can be set as discussed further in connection with FIG. 9b. In some cases, a parent may have previously entered incomplete information for setting parental controls. For instance, the parent may have set controls for restricting movies but not computer games or sharing of personal information over a network. Oftentimes, the process for setting parental controls is confusing or the parent may not be able to easily complete the task. The parent may be required to separately set each of a number of different settings. In this case, the remaining parent control settings can be set based on the determined age group.

Step 906 includes setting attributes other than parental control settings. Attributes other than parental control settings can also be used to control the user's interactions with the electronic media device. These attributes could include, e.g., a gamer profile, previous high scores in different games, preferences for viewing certain movies or television program genres and for playing certain games, preferences for display and audio settings, identities of friends (people who the user has agreed to communicate with and share information via a network), settings regarding what information can be exchanged with each friend, and so forth.

A gamer profile provides information regarding a user's gaming habits, such as the games played, and the achievements earned, such as high scores. A gaming profile can include an identifier such as a nickname, a score such as accumulated points across all of the games played, a reputation in the form of a ranking other users have provided, an identification of the type of gamers the users like to play with in online multiplayer games, such as professional or recreational level gamers, and specific accomplishments in the games played. The gamer profile can be shared with others.

Figure 9B:
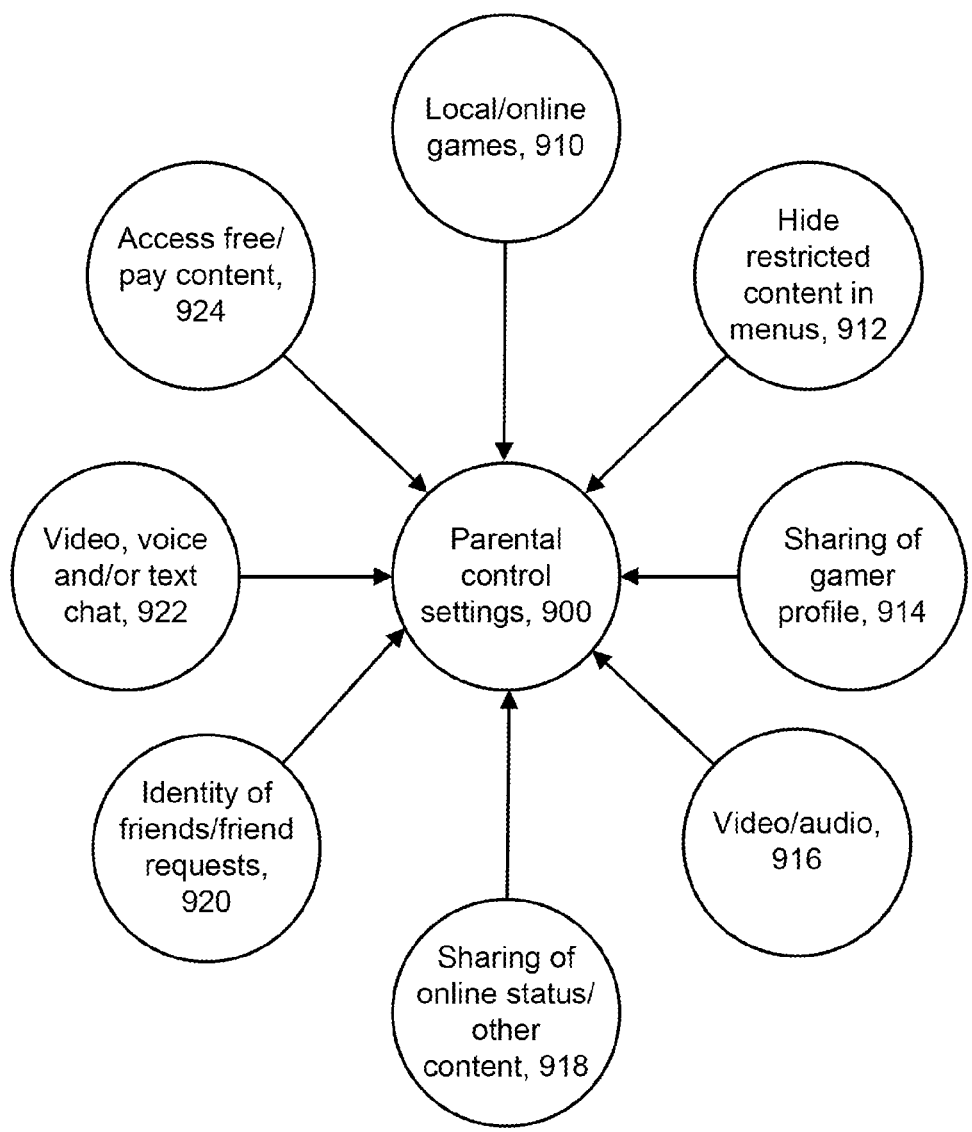
FIG. 9b depicts details of user profile attributes which can be set (step 506 of FIG. 5).

FIG. 9b depicts details of user profile attributes which can be set (step 506 of FIG. 5). Various attributes can be set regarding allowable content ratings, online interactions and content access, among other features. The parental control settings (900) can relate to one or more of: local or online games (910), whether or not to hide restricted content in on-screen menus (912), whether or not to share a gamer profile, and how much to share if sharing is allowed (914), the rating of video and/or audio content which can be accessed (916), whether or not to share an online status of the user or other content, and how much to share if sharing is allowed (918), whether or not to share the identity of a user's friends, and how much to share if sharing is allowed, as well as whether or not new friend requests received via a network can be presented to the user (920), whether or not video, voice and/or text chatting with another user via a network is allowed, including separate restrictions for communications initiated by the local user as opposed to a remote user (922), and whether free content can be accessed and/or downloaded via a network, and whether payment required content can be accessed and/or downloaded via a network, and if so, a dollar limit per day or other period, or per transaction (924).

Generally, the parental control settings that can be set by default based on the age group can include:
(1) Game Ratings:
Can choose M, T, E10, E or C as maximum rating that can be played on the game console.
(2) Video Ratings:
Movie Ratings—choose maximum rating allowed.
TV Ratings—choose maximum rating allowed.
Explicit Video (or Music) (allowed or blocked).
Unrated Video (allowed or blocked).
(3) Access to an online multiplayer gaming and digital media delivery service, one example of which is XBOX LIVE® from MICROSOFT CORPORATION® (allowed or blocked).
(4) Creating a membership or otherwise registering with an online multiplayer gaming and digital media delivery service (allowed or blocked).
(5) Restricted content. Show all content or hide restricted content in an on-screen menu. This can also apply to content which is available in an online marketplace which allows users to download purchased or promotional content such as movie and game trailers, videos, game demos, avatars and downloadable content such as map packs, gamer pictures, and user interface themes (such as XBOX 360® dashboard themes).
(6) Family Timer (Daily/Weekly/Off). This could relate to certain time periods in which the electronic media device can or cannot be used. For example, a younger child may not be able to access the electronic media device after 8 pm on weekdays, while an older child may be able to access the electronic media device until 10 pm on weekdays.
(7) Online Game play/Privacy and Friends/Online Content.
Free online multiplayer (allowed or blocked).
Online Games (allowed or blocked).
New Online Friends (Require approval or not).
Voice and Text (everyone, friends only, blocked): can your child communicate with other people by text or chat?
Video (everyone, friends only, blocked): communicating via video (video chat, in-game video).
Gamer Profile Sharing (everyone, friends only, blocked): who can see your child's gamer profile including motto, online achievements and game history.
Gamer Profile Viewing (everyone, friends only, blocked): can your child see other people's gamer profiles?
Online Status (everyone, friends only, blocked): who can see your child's online status (whether child is online or not)?
Friends List Sharing (everyone, friends only, blocked): who can see your child's friends?
Member content (everyone, friends only, blocked): Can your child access content created by other people, such as on an online multiplayer gaming and digital media delivery service (including images, text in games and gamer profiles).
Downloadable content (allowed, blocked): can your child download premium content from an online marketplace (games, add-ons, demos etc).

As an example, if a child is determined to be under age 10, the system could automatically set (without human intervention) the game ratings to E, the new online friends to require parent approval, the video to be blocked. and so forth. Some settings may already be set by default based on the age that the user provides when they create their account, but the techniques herein would allow such settings to be made directly and automatically without relying upon the user's self determination.

FIG. 9c depicts an on-screen program guide in which a listing for restricted content is grayed out. As mentioned in connection with item 912 in FIG. 9b, settings can be made regarding whether or not to hide restricted content in menus. For example, consider an electronic program guide 930 which is a type of menu which lists television or other video/audio programming in a table, where each row of the table represents a different channel or content provider, and the columns represent time periods. In the example, the program represented by block 932 has a content rating which exceeds the allowable content which can be presented to the user. The block is represented by a grayed out region so that the title of the program and any other description is not presented. This prevents a child from seeing potential mature descriptive information. Each program can include a textual description and optionally images or video.

Generally, a process can be performed for obtain a rating identifier from video/audio content which is received by, or otherwise accessible to, the electronic media device. For example, for digital video which is encoded according to the MPEG-2 standard, a rating_attribute field can be extracted during decoding which indicates an age-based attribute for overall rating as well as for violence, language, sexual content, dialogue and fantasy violence. This content rating can be compared to the maximum allowable rating for the user to determine whether or not to change the presentation of a description program in the electronic program guide (as well as to determine if a user is authorized to view the program itself). If the content rating exceeds the maximum allowable rating, the presentation of a description of a program in the electronic program guide can be made in an altered form or omitted altogether.

FIG. 9d depicts an on-screen program guide 940 in which a listing for restricted content does not appear. In this case, the listing (horizontal row) for content which the user is restricted from accessing does not appear in the on-screen electronic program guide menu. Another possible approach is to list the program using a text description but disable any associated images or video previews.

Figure 10:
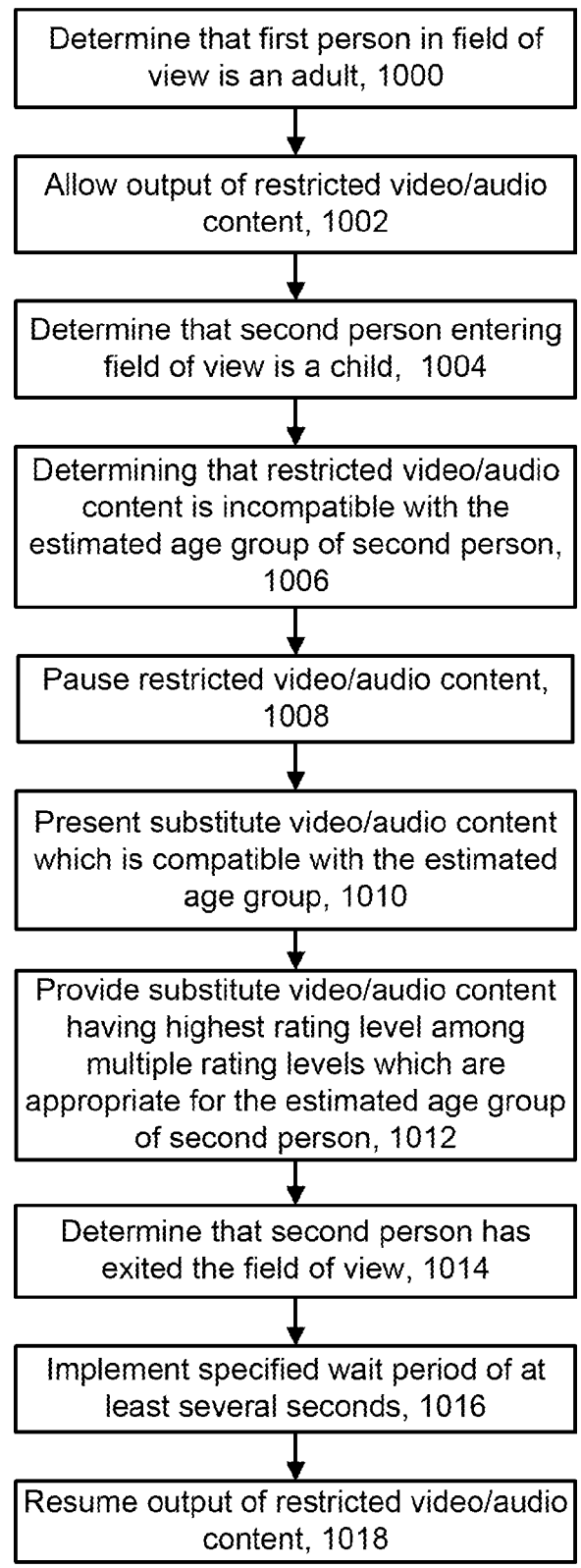
FIG. 10 depicts details of controlling a current video/audio output (step 510 of FIG. 5).

FIG. 10 depicts details of controlling a current video/audio output (step 510 of FIG. 5). The concept of restricting content can apply to the person who is currently logged on to, or otherwise interacting with, an electronic media device, as well as to other persons who are in the field of view of the camera. Consider a scenario where an adult is alone in a room, playing a mature-rated computer game which has graphic violence, when a young child walks into the room. With techniques provided herein, the child can be recognized as a person for whom the currently displayed content is unsuitable, and the system can take an appropriate action such as pausing the game and displaying substitute content such as a neutral screen saver for as long as the child is detected by the camera.

In an example process, step 1000 determines that a first person in the field of view is an adult. Step 1002 allows output of restricted video/audio content, such as the mature-rated game. Step 1004 determines that a second person entering the field of view is a child, or otherwise someone for whom the content is inappropriate. Step 1006 determines that the currently presented, restricted video/audio content is incompatible with the estimated age group of the second person. Step 1008 includes pausing the restricted video/audio content. Step 1010 includes presenting substitute video/audio content which is compatible with the estimated age group of the second person. Step 1012 includes optionally providing substitute video/audio having the highest rating level among multiple rating levels which are appropriate for the estimated age group of the second person. For example, instead of displaying substitute content which is suitable for a child in general, the substitute content may be suitable for an older child when the second person is determined to be an older child, or for a younger child when the second person is determined to be a younger child. In this way, the substitute content which is provided is not unnecessarily childish.

Step 1014 includes determining that the second person has exited the field of view. This can involve, e.g., tracking the second person in a direction of a boundary of the field of view and then no longer detecting the person for a certain period of time. For example, step 1016 implements a specified wait period of at least several seconds, e.g., 3 or more seconds. This may be based on the time it takes a person to walk sufficiently far away from an area in which the electronic media device is located so that resuming the output of the restricted content is not offensive to the exiting person. Step 1018 includes resuming output of the restricted video/audio content, e.g., from the point at which it was paused.

Figure 11:
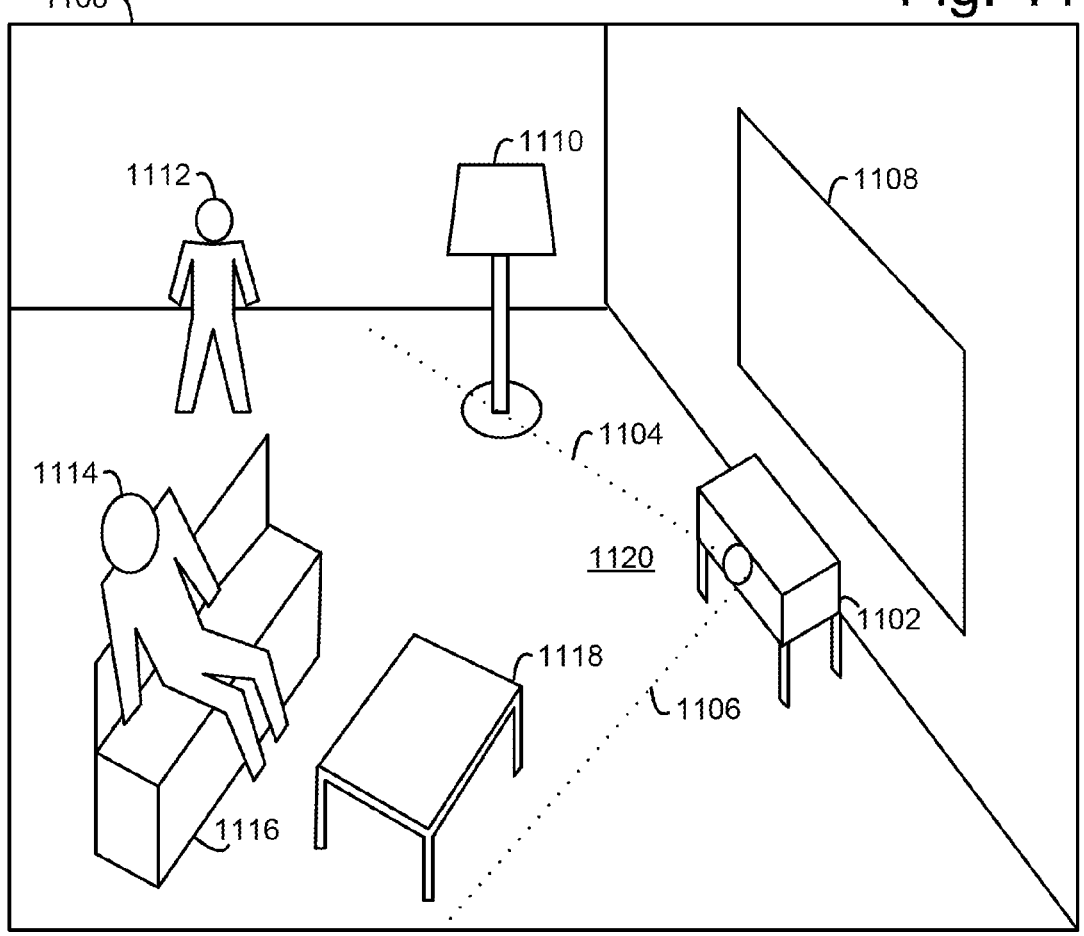
FIG. 11 depicts an example scenario associated with FIG. 10 in which a second person enters a field of view of a camera while a first person is viewing restricted content.

FIG. 11 depicts an example scenario associated with FIG. 10 in which a second user enters a field of view of a camera while a first user is viewing restricted content. This scenario depicts a room 1100 in which an adult 1114 is watching a display device 1108 using an electronic media device 1102, which includes a camera. Furniture in the room such as a couch 1116, coffee table 1118 and lamp 1110 are also depicted. The field of view 1120 extends between boundary lines 1104 and 1160. Initially, the adult 1114 is alone in the room. When another person such as child 1112 enters the room, the child is detected by the electronic media device 1102, and the child's age group is immediately determined so that substitute content can be provided on the display device 1108.

Note that when multiple people are in a room, they may be associated with different age groups. Generally, a policy can be implemented that the lowest age group prevails so that the youngest person is not exposed to inappropriate content. However, it is also possible for an older age group to prevail, based on a policy that it is acceptable for the younger person to view the content when an older person is present. A modification of this policy is that the older age group prevails, up to a maximum content rating. For instance, a child alone may be permitted to view only a G rated movie, while an adult alone is permitted to view an R rated movie. As a compromise, the child and parent together are permitted to view, say, a PG rated movie. Thus, the allowed content rating is intermediate to the lower and higher content ratings.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A processor-implemented method for controlling access to an electronic media device, comprising the processor-implemented steps of:
    tracking a body of a user in a field of view of a camera, the tracking comprises determining a model of the body;
    determining, based on the model, an absolute size, and a ratio of sizes, for a part of the body, the part of the body is at least one of an arm or a leg, the absolute size is a length of the at least one of the arm or the leg, and the ratio is a ratio of the length of the at least one of the arm or the leg to a height of the user;
    determining an estimated age group of the user based on the absolute size, and the ratio of sizes, for the part of the body; and
    based on the estimated age group, updating a profile of the user at the electronic media device with a parental control setting.

2. The processor-implemented method of claim 1, wherein:
    the profile is updated to indicate that the user is classified into one age group for controlling access to movies and into another age group, different than the one age group, for controlling access to computer games.

3. The processor-implemented method of claim 1, wherein:
    the model comprises a 3-D skeletal model.

4. The processor-implemented method of claim 1, wherein:
    the parental control setting controls at least one of: whether a gamer profile of the user can be shared via a network with another, remote user, or whether the user can access a gamer profile of another, remote user via a network.

5. The processor-implemented method of claim 1, wherein:
    the parental control setting indicates whether: the user can engage in a video, voice and/or text chat with another, remote user without restrictions, the user can engage in a video, voice and/or text chat with another, remote user, if the another, remote user is a previously-identified friend according to the user's profile, or the user cannot engage in a video, voice and/or text chat with the another, remote user.

6. The processor-implemented method of claim 1, wherein:
the parental control setting separately controls access to: a capability of the electronic media device for accessing content via a network for a fee, and a capability of the electronic media device for accessing content via a network without a fee.

7. A system for controlling access to an electronic media device, comprising:
a depth camera system having a field of view;
a display; and
a processor in communication with the depth camera system and the display, the processor executes instructions to track movement of a body of a user and to provide a signal to the display to display images, one or more of the depth camera system and the processor:
to track the body in the field of view, determine a model of the body;
determine at least first and second metrics of the body, based on the model;
select an age group to represent the user from among a plurality of age groups which comprise a first age group which correlates with the first metric and a second age group which correlates with the second metric;
to select the age group to represent the user, assigns weights to the metrics, including a greater weight which is assigned to the first metric than to the second metric when the first metric is a more reliable predictor of age than the second metric; and
based on the selected age group, update a profile of the user at the electronic media device with a parental control setting.

8. The system of claim 7, wherein:
the parental control setting controls whether at least one of: an online status of the user or an identity of friends of the user, can be shared via a network with another, remote user.

9. The system of claim 7, wherein:
the parental control setting controls access to a capability of the electronic media device for displaying to the user, a friend request which is received via a network from another, remote user.

10. The system of claim 7, wherein:
the parental control setting controls access to a capability of the electronic media device for purchasing content to be download to the electronic media device.

11. The system of claim 7, wherein the one or more of the depth camera system and the processor:
to select the age group to represent the user, applies a conservative policy which selects a youngest age group of the plurality of age groups if none of the at least first and second metrics correlates to an age group with a sufficiently high probability.

12. The system of claim 7, wherein the one or more of the depth camera system and the processor:
determine a third metric of the body, based on the model, the third metric correlates to an age group in the plurality of age groups; and
to select the age group to represent the user, select one of the plurality of age groups to which a majority of the metrics are correlated.

13. A processor-implemented method for controlling access to an electronic media device, comprising the processor-implemented steps of:
tracking a body of a user in a field of view of a camera, the tracking comprises determining a model of the body;
determining, based on the model, an absolute size, and a ratio of sizes, for a part of the body, the part of the body is a head, the absolute size is at least one of a height or a width of the head, and the ratio is a ratio of the at least one of the height or the width of the head to a height of the user;
determining an estimated age group of the user based on the absolute size, and the ratio of sizes, for the part of the body; and
based on the estimated age group, updating a profile of the user at the electronic media device with a parental control setting.

14. The processor-implemented method of claim 13, wherein:
the model comprises a 3-D skeletal model.

* * * * *